United States Patent
Park et al.

(10) Patent No.: US 7,217,004 B2
(45) Date of Patent: May 15, 2007

(54) LIGHT EMITTING DIODE ARRAY MODULE FOR PROVIDING BACKLIGHT AND BACKLIGHT UNIT HAVING THE SAME

(75) Inventors: Jung Kyu Park, Kyungki-do (KR); Chang Wook Kim, Kyungki-do (KR); Young Sam Park, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 63 days.

(21) Appl. No.: 10/890,201

(22) Filed: Jul. 14, 2004

(65) Prior Publication Data
US 2005/0243576 A1 Nov. 3, 2005

(30) Foreign Application Priority Data
May 3, 2004 (KR) .................. 10-2004-0031110

(51) Int. Cl.
*F21V 1/00* (2006.01)
(52) U.S. Cl. .............. 362/240; 362/245; 362/249; 362/800
(58) Field of Classification Search ............. 362/800, 362/30, 294, 240, 244, 245, 231
See application file for complete search history.

(56) References Cited
U.S. PATENT DOCUMENTS

| | | | |
|---|---|---|---|
| 1,374,900 A * | 4/1921 | Benzer et al. ............. 362/337 |
| 5,782,555 A * | 7/1998 | Hochstein ................. 362/373 |
| 6,608,614 B1 | 8/2003 | Johnson |
| 2002/0191407 A1* | 12/2002 | Haen et al. .............. 362/485 |
| 2003/0072156 A1* | 4/2003 | Pohlert et al. ........... 362/244 |
| 2004/0223328 A1* | 11/2004 | Lee et al. ................ 362/249 |
| 2005/0047130 A1* | 3/2005 | Waters .................... 362/231 |
| 2005/0195602 A1* | 9/2005 | Pan ......................... 362/245 |

* cited by examiner

*Primary Examiner*—Renee Luebke
*Assistant Examiner*—Zahra I. Bennett
(74) *Attorney, Agent, or Firm*—Lowe Hauptman & Berner, LLP.

(57) ABSTRACT

A Light Emitting Diode (LED) array module, which can be used as backlight, includes a bar-shaped Printed Circuit Board (PCB) on which conductive patterns for transmitting power are formed, a base formed on the PCB and made of a heat conductive material, a plurality of LED chips mounted on the base in a line and electrically connected to the conductive patterns of the PCB, a reflector formed to surround the plurality of the LED chips and adapted to reflect light radiated from the plurality of LED chips upward, and a lens formed above the plurality of LED chips and reflector to have a bar shape and adapted to diffuse the light radiated from the plurality of LED chips and reflector in a horizontal direction.

8 Claims, 4 Drawing Sheets

(a)

(b)

US 7,217,004 B2

LIGHT EMITTING DIODE ARRAY MODULE FOR PROVIDING BACKLIGHT AND BACKLIGHT UNIT HAVING THE SAME

RELATED APPLICATIONS

The present application is based on, and claims priority from, Republic of Korea Application Ser. No. 2004-31110, filed May 3, 2004, the disclosure of which is hereby incorporated by reference herein in its entirety.

BACKGROUND OF THE INVENTION

1. Field of the Invention

The present invention relates generally to a backlight for a liquid crystal display television and, more particularly, to a liquid crystal display array module for providing backlight, which can be used as an independent device with a plurality of light emitting diodes being integrally packaged, and which can be universally used regardless of a screen size, and a backlight unit having the same.

2. Description of the Related Art

Light Emitting Diodes (LEDs) are semiconductor light emitting devices that are light emitting sources formed through the modification of compound semiconductor materials, such as GaAs, AlGaAs, GaN, InGaN and AlGaInP, and generate light of various colors. Additionally, for the criteria of determining the characteristics of an LED device, there are a color, luminance and the intensity of light. Such characteristics of the LED device are determined first by a compound semiconductor material used in the LED device, and considerably affected second by the structure of a package for mounting an LED chip.

Especially, with the advent of high efficiency three primary color (red, blue and green) and white color LEDs implemented using GaN whose physical and chemical characteristics are excellent, the application of LEDs is extended to and used in various fields, such as the backlights of a keypad and a Liquid Crystal Display (LCD) device, a signal light, the guide light of an airport runway, and the reading lights and illumination lights of an airplane and an automobile having high directionality.

FIGS. 1a and 1b are a perspective view and a cross section showing an LED device 10 used as the light source of conventional backlight, respectively.

Referring to the drawings, the LED device 10 is formed in such a way that a frame 11 made of a plastic material is provided with leads 11a for inputting and outputting electric signals and a heat sink 12 made of a conductive material, an LED chip 14 is mounted on the heat sink 12, and a lens 16 constructed to reflect light generated from the LED chip 14 in a horizontal direction is combined with the upper portion of the frame 11.

A package structure formed of the frame 11 and the lens 16 is constructed to radiate light generated from the LED chip 14 in an almost horizontal direction and discharge heat generated from the LED chip 14 to the outside thereof, so that stable operating characteristics can be achieved.

FIG. 2 is a view showing a conventional backlight unit implemented using LED devices 10 having such horizontally emitting characteristics, and FIG. 3 is an enlarged view showing an LED array 21 included in the backlight unit of FIG. 2.

As shown in FIGS. 2 and 3, the conventional backlight unit 20 is packaged as shown in FIG. 1, and an LED array module 21 of the conventional backlight unit 20 is formed in such a way that a plurality of LED devices 10 each radiating one of red, blue and green light are mounted in a line to allow three primary colors to be alternately arranged on a Printed Circuit Board (PCB) 30 in which a printed circuit pattern for transmitting electric signals is formed. Additionally, the backlight unit 20 is divided into two equal parts, the LED array module 21 is arranged on the center portion of each divided part, and reflection plates 23 for reflecting horizontally radiated light in a vertical direction are formed on the both sides of the LED array module 21. The PCB 30 of the array module 21 is made of a highly conductive material, such as Al, to increase heat radiation efficiency.

The light radiated from the LED devices 10 that are mounted on the LED array modules 21 is refracted in a vertical direction and dispersed to an entire display screen.

The number of the array modules 21 required by the backlight unit 20 increases in proportion to the screen size of a corresponding display device, and the number of the LED devices 10 required by each LED array module 21 also varies with the screen size of the display device.

Accordingly, as described above, the conventional backlight unit is disadvantageous in that array modules 21 and reflectors 23 should be redesigned in accordance with the screen size of a display device, and the number of high priced-LED devices 10 is increased in proportion to the screen size of the display device.

Furthermore, since the conventional backlight unit causes array modules to be arranged in parallel, the conventional backlight unit is problematic in that the luminance characteristics of the edge portions of the backlight unit spaced apart from the array module 21 are relatively deteriorated compared to those of the center portion thereof.

Furthermore, since the LED array module is constructed to be a single unit, the conventional backlight unit is problematic in that the entire LED array module must be inspected for a defect in the case where the defect occurs in a portion thereof.

SUMMARY OF THE INVENTION

Accordingly, the present invention has been made keeping in mind the above problems occurring in the prior art, and an object of the present invention is to provide an LED array module for providing backlight, which can be used as an independent device with a plurality of LEDs being integrally packaged and be universally used regardless of a screen size, and a backlight unit having the same.

In order to accomplish the above object, the present invention provides a LED array module used as a light source of backlight, including a bar-shaped PCB on which conductive patterns for transmitting power are formed, a base formed on the PCB and made of a heat conductive material, a plurality of LED chips mounted on the base in a line and electrically connected to the conductive patterns of the PCB, a reflector formed to surround the plurality of the LED chips and adapted to reflect light radiated from the plurality of LED chips upward, and a lens formed above the plurality of LED chips and reflector to have a bar shape and adapted to diffuse the light radiated from the plurality of LED chips and reflector in a horizontal direction.

The plurality of LEDs mounted on the base may be formed of LEDs each of which radiate one of red, green and blue light to form white light in combination.

The lens may have a structure that allows light to be diffused along the longitudinal direction of the module.

In order to accomplish the above object, the present invention provides a backlight unit for a display device, wherein a plurality of LED array modules set forth in any of claims 1 to 6 are arranged in a plurality of rows and columns, the LED array modules being arranged at regular intervals in each of the rows, each of LED array modules in a first row being located to face a space between two adjacent LED array modules in a second row in a relationship of two adjacent rows.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

An LED array module for providing backlight and a backlight unit according to the present invention are described with reference to the attached drawings below.

Figure 4:
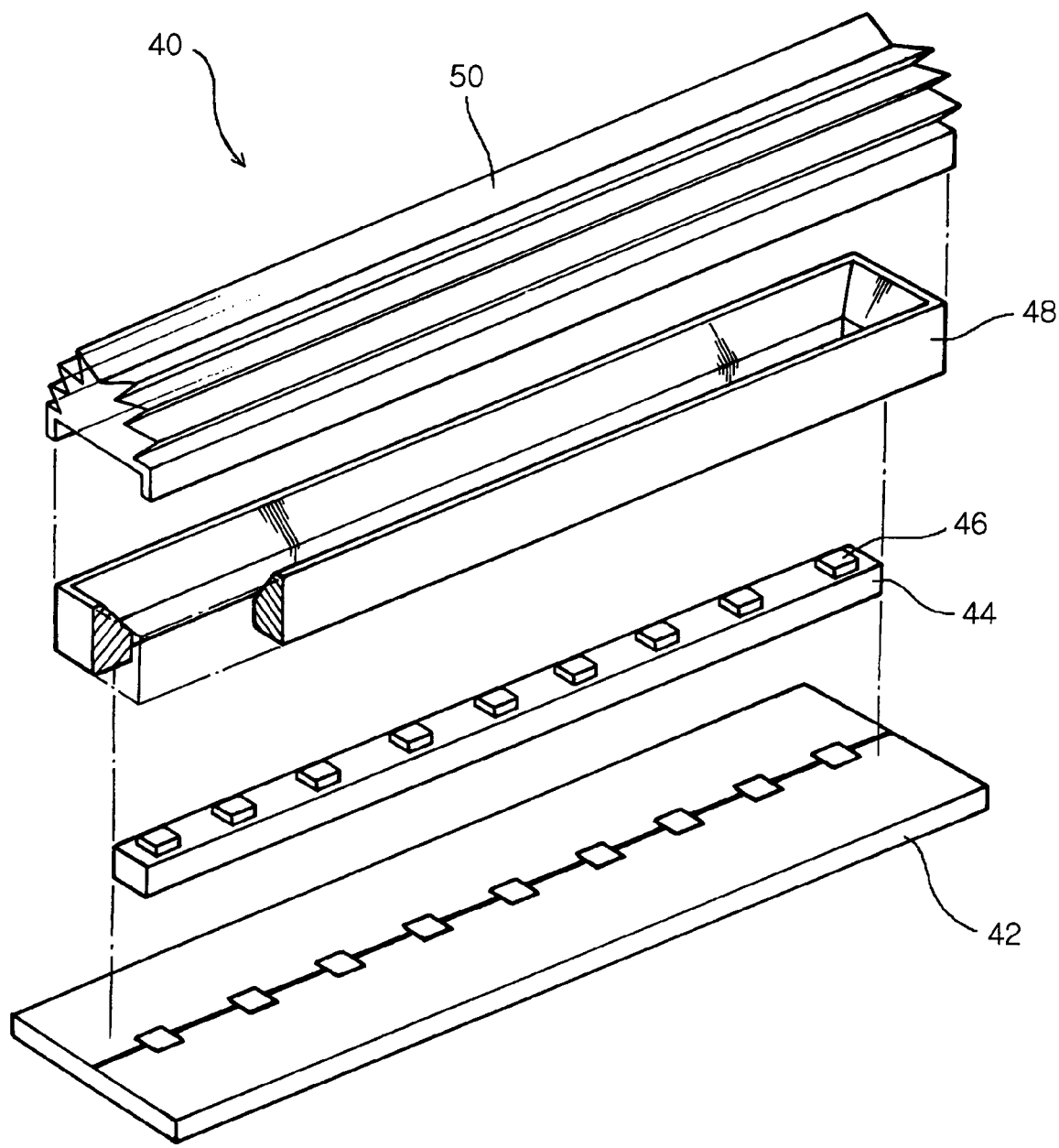
FIG. 4 is an exploded perspective view showing the structure of an LED array module for providing backlight according to the present invention.

FIG. 4 is an exploded perspective view showing an LED array module according to an embodiment of the present invention.

As shown in FIG. 4, the LED array module 40 of the present invention includes a bar-shaped PCB 42 of a certain length on which a conductive pattern for transmitting electric signals is formed, a base 44 made of a heat conductive material and located on the PCB 42, a plurality of LED chips 46 mounted on the base 44 in a line, and electrically connected to the conductive pattern of the PCB 42, a reflector 48 formed to surround the LED chips 46 to reflect light radiated from the LED chips 46 upward, and a lens 50 formed above the LED chips 46 and the reflector 48 to diffuse the light projected from the LED chips 46 and reflector 48 in an almost horizontal direction.

The above-described PCB 42 functions not only to apply electric signals to the plurality of LED chips 46 but also to transmit heat, generated when the plurality of LED chips 46 are operated, to the outside thereof. Accordingly, the conductive pattern for inputting, outputting and transmitting the electric signals is formed on the PCB 42, and the conductive pattern is implemented using a material having high conductive efficiency, such as aluminum Al. In this case, the size of the PCB 42 can be standardized as a certain length that is set irrespective of the screen size of a corresponding LCD. The size of the PCB 42 is dependent on the number of LED chips 46 to be mounted, and the number of LED chips 46 can be standardized and set irrespective of the screen size of the LCD.

Thereafter, the plurality of LED chips 46 are mounted on the PCB 42. In this case, the base 44, which has a structure to easily radiate heat and/or is made of a material having high heat conductivity, is interposed between the PCB 42 and the LED chips 46 to facilitate the heat radiation of the LED chips 46. The base 44 can have a well-known heat sink structure and be made of a well-known heat sink material. In this case, the base 44 is constructed to allow not a single LED chip but a plurality of LED chips 46, which are mounted on the PCB 42, to simultaneously radiate heat. The plurality of LED chips 46 can be mounted on the base 44 by wire bonding or flip-chip bonding.

Furthermore, the reflector 48 is formed on the PCB 42 to upwardly focus light that is generated from the plurality of LED chips 46 and radiated in various directions. The reflector 48 is implemented in such a way that inclined surfaces forming a certain angle with respect to the mounting surface of the LED chips 46 are constructed to surround the plurality of LED chips 46 and then a metal reflective material is plated on the inclined surfaces, or inclined metal reflection plates of the certain angle are attached to surround the plurality of LED chips 46. In this case, the angle of the declined reflector 48 can be adjusted in accordance with required luminance characteristics.

Thereafter, the lens 50 is formed above the plurality of LED chips 46 and reflector 48, is made of a transparent material that allows light to pass therethrough, and is configured to have a bar shape. In this case, the reflection plate of the lens 50 can have any configuration if the configuration refracts light, projected from below, in an almost horizontal direction.

The plurality of LED chips 46 are encapsulated by resin. It is preferable that the encapsulant used in the encapsulation is a soft material that has a low stress or can provide cushioning to the LED chips 46. Furthermore, the encapsulant can make the radiation of light easy by being implemented using a material whose refractive index is similar to that of the lens 50.

The lens 50 can be integrated with the encapsulant, or previously formed and then mounted on or combined with the encapsulant.

Figure 5:
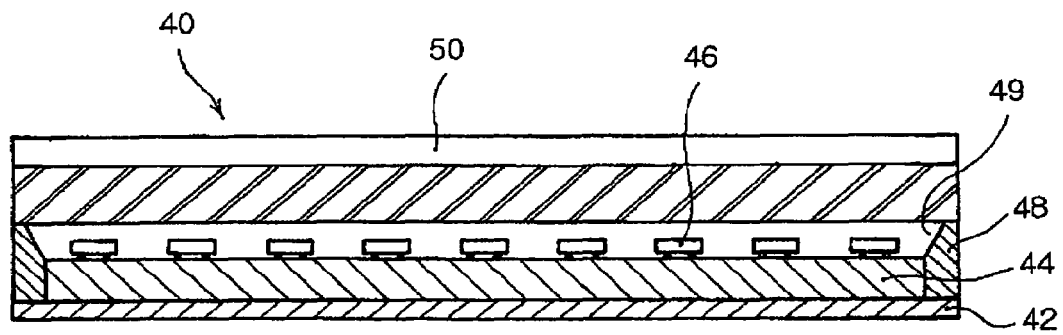
FIG. 5 is a longitudinal section of the LED array module of the present invention.

FIG. 5 is a longitudinal section of the above-described LED array module 40.

As shown in FIG. 5, the LED array module 40 is packaged in such a way that a plurality of LED chips 46, which are not packaged, are mounted on the PCB 42 through a base 44 having a heat sink structure, and then a reflector 48, an encapsulant 49 and a lens 50 are formed at once. The plurality of LED chips 46 are arranged in a line to be spaced apart from each other at predetermined intervals, and arranged, for example, in the sequence of Red R, Green G and Blue B LED chips. The sequence of arrangement and the ratio of the red, green and blue LEDs may be determined according to the luminance characteristics of corresponding LED chips 46.

When an electric signal is applied to the LED chips 46 through the PCB 42, light is radiated from the LED chips 46. In this case, some of light generated in the LED chips 46, which is diffused in a vertical direction, is projected into the lens 50, and light radiated in an almost horizontal direction is totally reflected by the reflector 48, so that the paths of the light are changed. Accordingly, radiated light of various colors is reflected by the reflector 48, and forms white light when mixed together. This white light is finally refracted upward and projected into the lens 50. The lens 50 functions to change the paths of the projected light to the paths in a horizontal direction.

As described above, the three primary colors are mixed together in the LED array module 40, and the LED array module 40 can have a uniform emission effect. Furthermore, in the case where the encapsulant 49 is formed by mixing resin with a predetermined amount of dispersant, the three primary colors can be more uniformly mixed together.

The LED array module 40 is manufactured in such a way that a base 44 is formed to have a heat sink structure and include an electric pattern for allowing a plurality of chips to be flip-chip or wire bonded thereon and an electric connection means for electrically connecting the electric pattern to the lower part thereof, the base 44 and the reflector 48 are mounted on the PCB 42, the plurality of LED chips 46 are bonded on the base 44, the LED chips 46 are encapsulated, and a bar-shaped lens 50 is mounted and then cured.

The LED array module 40 of the present invention is configured to be an independent package having a certain unit size. Accordingly, when a backlight unit is assembled, a plurality of LED array modules 40 are properly arranged and used on the backlight unit.

Figure 6:
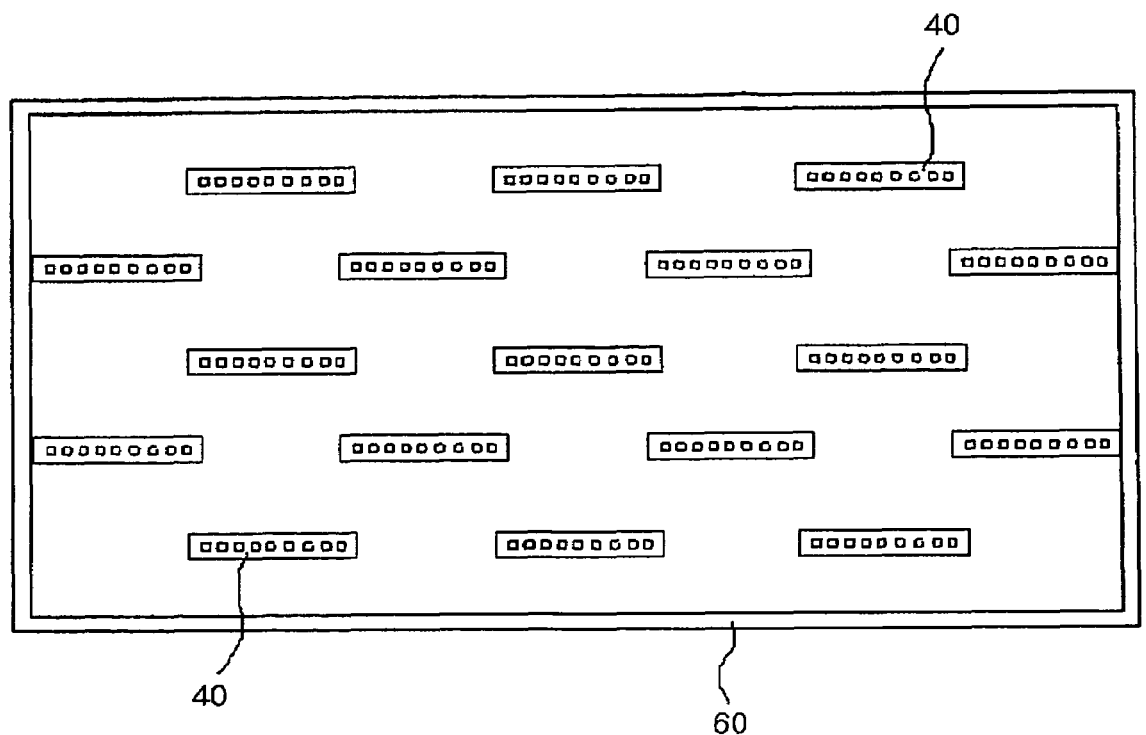
FIG. 6 is a top view of a backlight unit implemented using the LED array modules of the present invention.

FIG. 6 is a top view of the backlight unit implemented using the LED array modules 40 according to a preferred embodiment of the present invention.

In the backlight unit 60 of the present invention, the array modules 40 are arranged in a plurality of rows and columns having predetermined intervals therebetween. In this case, in each row, the plurality of LED array modules 40 are arranged along the longitudinal direction of the backlight unit 60 to be spaced apart from each other by a predetermined interval. Additionally, between two adjacent rows, each of the LED array modules 40 in one row are located to face a space between two LED array modules 40 in the other adjacent row.

That is, the plurality of LED array modules 40 are arranged on the backlight unit 60 in a regular diamond pattern.

Figure 1:
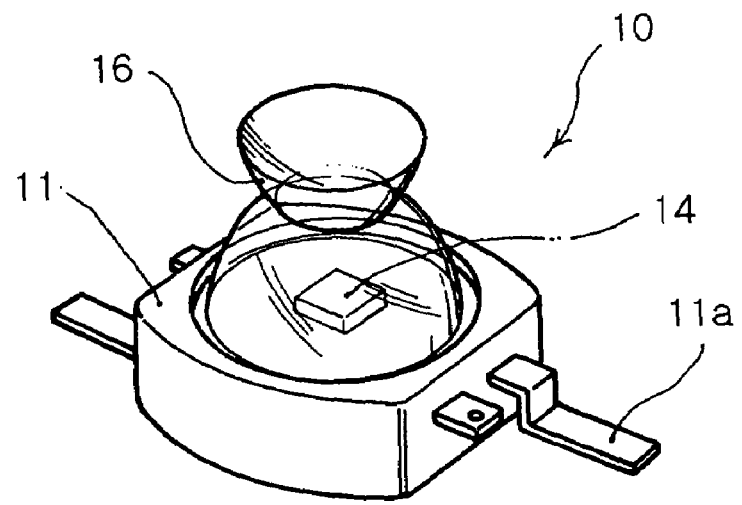
FIGS. 1a and 1b are a perspective view and a cross section of a conventional LED device, respectively.
Figure 1:
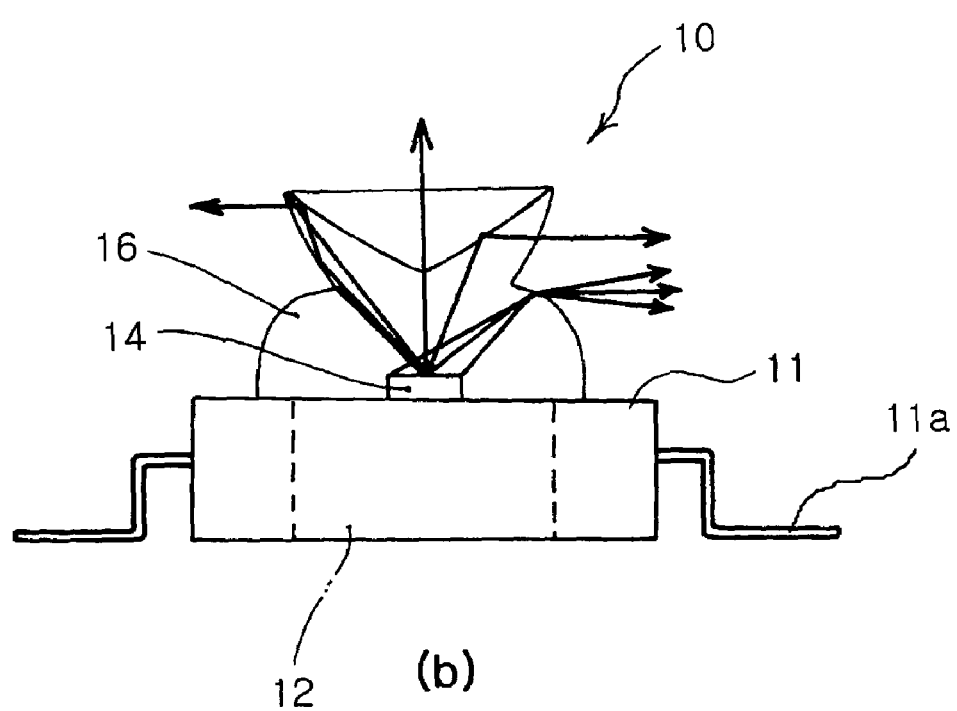
Figure 2:
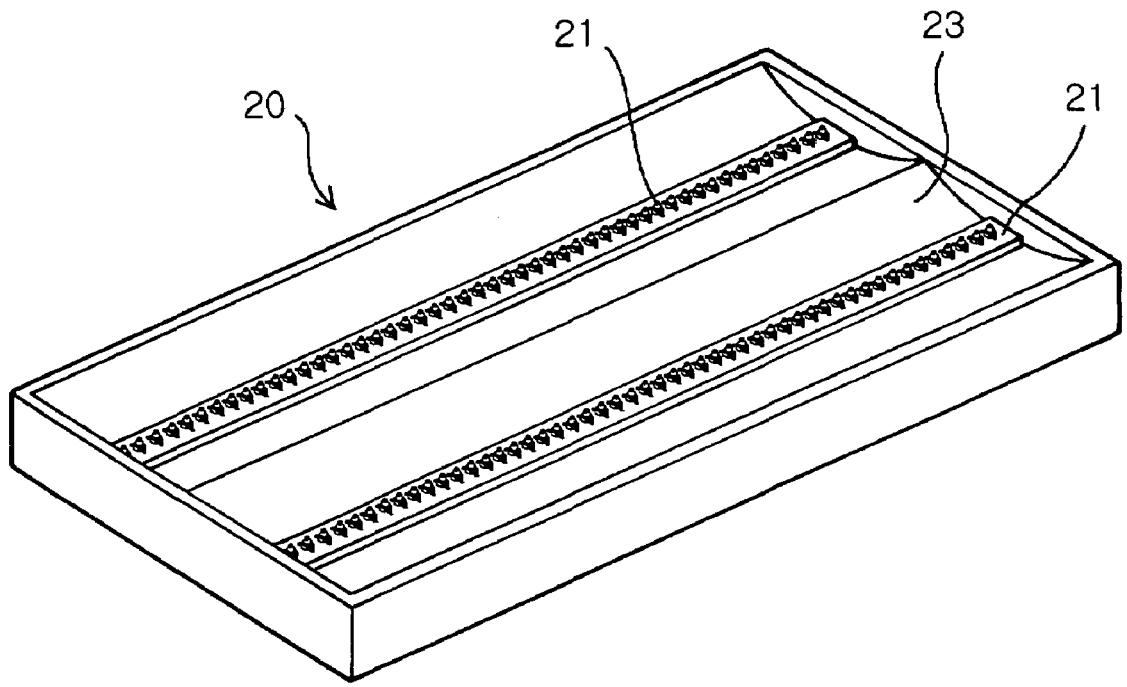
FIG. 2 is a top view of a backlight unit implemented using conventional LED devices.
Figure 3:
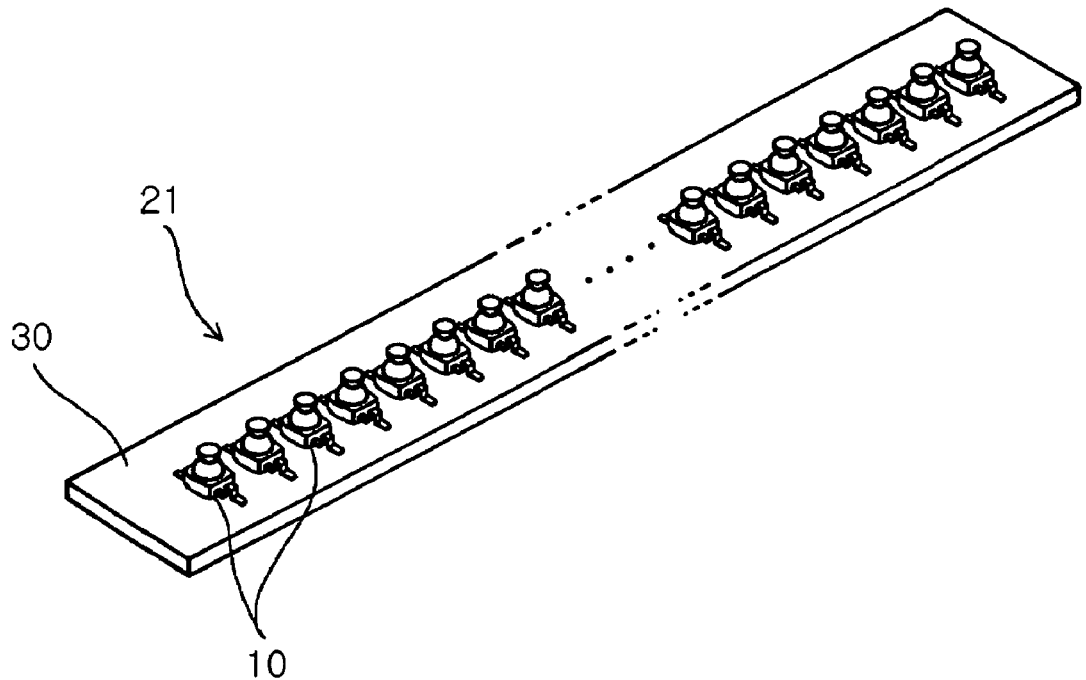
FIG. 3 is an enlarged view of an LED array module included in the conventional backlight unit.

When the LED array modules 40 are implemented as described above, a uniform luminance characteristic ranged all regions of the backlight unit 60 can be achieved, and the number of LED chips can be reduced compared to the backlight unit 60 shown in FIG. 2.

Additionally, by properly arranging the LED array modules 40 of the present invention in different forms, a backlight unit 60 capable of providing a required luminance characteristic can be implemented.

For example, by attaching a plurality of array modules 40 having a unit length according to the present invention to each other in a line, two-line LED arrays can be implemented, as shown in the backlight unit of FIG. 2. In this case, since the structure or design of the LED array modules 40 is not modified but only the number of the LED array modules 40 is increased and assembled even though a screen size is increased, the manufacture of the backlight unit can be facilitated. However, in this case, it is difficult to obtain a uniform emission characteristic.

As described above, the present invention provides an LED array module in which a plurality of LED chips are integrally packaged, so that an LED array for backlight can be inexpensively and easily implemented, and a backlight unit can be implemented without modifying the LED array in accordance with screen size, thus achieving the universal use thereof. Furthermore, since the LED array is implemented as a unit length, the entire backlight unit is not replaced but only defects are replaced when the defects occur, so that the present invention is effective in that the manufacture and repair thereof are easy.

The LED array modules and the backlight unit according to the present invention are not limited by the above-described embodiments, and various modifications and substitutions are possible without departing from the scope and spirit of the invention.

What is claimed is:

1. A backlight unit for a display device, said backlight unit comprising a plurality of Light Emitting Diode (LED) array modules arranged in a plurality of rows and columns, the LED array modules being arranged at regular intervals in each of the rows, each of LED array modules in a first row being located to face a space between two adjacent LED array modules in a second row in a relationship of two adjacent rows;

each of said LED array modules comprising:
a bar-shaped Printed Circuit Board (PCB) on which conductive patterns for transmitting power are formed;
a base formed on the PCB and made of a heat conductive material;
a plurality of LED chips mounted on the base in a line and electrically connected to the conductive patterns of the PCB;
a reflector formed to surround the plurality of the LED chips and adapted to reflect light radiated from the plurality of LED chips upward; and
a lens which is formed above the plurality of LED chips and the reflector, and has a bar shape;
wherein said lens diffuses, in a horizontal direction, the light radiated from the plurality of LED chips and reflected by the reflector.

2. A Light Emitting Diode (LED) array module for use as a light source of a backlight unit, said LED module comprising:
a bar-shaped Printed Circuit Board (PCB) on which conductive patterns for transmitting power are formed;
a base formed on the PCB and made of a heat conductive material;
a plurality of LED chips mounted on the base in a line and electrically connected to the conductive patterns of the PCB;
a reflector formed to surround the plurality of the LED chips and adapted to reflect light radiated from the plurality of LED chips upward; and
a lens which is formed above the plurality of LED chips and the reflector, and has a bar shape;
wherein
said lens diffuses, in a horizontal direction, the light radiated from the plurality of LED chips and reflected by the reflector; and the lens has a cross section taken perpendicular to a longitudinal direction of said bar shape, said cross section having a star shape comprising multiple triangular points radiating from a center.

3. A Light Emitting Diode (LED) array module, comprising:
a Printed Circuit Board (PCB) which is elongated in a longitudinal direction of said module and on which conductive patterns for transmitting power are formed;
a base which is elongated in the longitudinal direction of said module, placed above the PCB, and made of a heat conductive material;
a plurality of LED chips which are mounted on an upper surface of the base in a line extending along the longitudinal direction of said module, said LED chips being electrically connected to the conductive patterns of the PCB;
a reflector which is elongated in the longitudinal direction of said module, surrounds said LED chips, and is adapted to upwardly reflect light radiated from the LED chips;

a lens which is elongated in the longitudinal direction of said module, placed above said LED chips and said reflector, and adapted to diffuse, in a horizontal direction, light coming from said LED chips and said reflector; and an encapsulant made of a transparent material covering and protecting said LED chips;

said encapsulant being elongated in the longitudinal direction of said module and confined within a space defined by inner walls of said reflector.

4. The LED module as set forth in claim 3, wherein the lens is upwardly spaced from said encapsulant.

5. A Light Emitting Diode (LED) array module, comprising:

a Printed Circuit Board (PCB) which is elongated in a longitudinal direction of said module and on which conductive patterns for transmitting power are formed;

a base which is elongated in the longitudinal direction of said module, placed above the PCB, and made of a heat conductive material;

a plurality of LED chips which are mounted on an upper surface of the base in a line extending alone the longitudinal direction of said module, said LED chips being electrically connected to the conductive patterns of the PCB;

a reflector which is elongated in the longitudinal direction of said module, surrounds said LED chips, and is adapted to upwardly reflect light radiated from the LED chips; and a lens which is elongated in the longitudinal direction of said module, placed above said LED chips and said reflector, and adapted to diffuse, in a horizontal direction, light coming from said LED chips and said reflector;

wherein said reflector is positioned on said PCB and surrounds not only said led chips but also said base.

6. A backlight unit for a display device, said backlight unit comprising a plurality of Light Emitting Diode (LED) array modules, wherein said LED array modules are arranged in a plurality of rows;

the longitudinal directions of the LED array modules in each of said rows are aligned; and the LED array modules in two adjacent of said rows are staggered, in a direction perpendicular to said rows, with respect to each other;

each of said LED array modules comprising:

a Printed Circuit Board (PCB) which is elongated in a longitudinal direction of said module and on which conductive patterns for transmitting power are formed;

a base which is elongated in the longitudinal direction of said module, placed above the PCB, and made of a heat conductive material;

a plurality of LED chips which are mounted on an upper surface of the base in a line extending along the longitudinal direction of said module, said LED chips being electrically connected to the conductive patterns of the PCB;

a reflector which is elongated in the longitudinal direction of said module, surrounds said LED chips, and is adapted to upwardly reflect light radiated from the LED chips; and a lens which is elongated in the longitudinal direction of said module, placed above said LED chips and said reflector, and adapted to diffuse, in a horizontal direction, light coming from said LED chips and said reflector.

7. The backlight unit as set forth in claim 6, wherein the numbers of the LED array modules in two adjacent of said rows are different.

8. A Light Emitting Diode (LED) array module, comprising:

a Printed Circuit Board (PCB) which is elongated in a longitudinal direction of said module and on which conductive patterns for transmitting power are formed;

a base which is elongated in the longitudinal direction of said module, placed above the PCB, and made of a heat conductive material;

a plurality of LED chips which are mounted on an upper surface of the base in a line extending along the longitudinal direction of said module, said LED chips being electrically connected to the conductive patterns of the PCB;

a reflector which is elongated in the longitudinal direction of said module, surrounds said LED chips, and is adapted to upwardly reflect light radiated from the LED chips; and a lens which is elongated in the longitudinal direction of said module, placed above said LED chips and said reflector, and adapted to diffuse, in a horizontal direction, light coming from said LED chips and said reflector;

wherein the lens comprises a plurality of projections elongated in said longitudinal direction; and lens has a cross section taken perpendicular to said longitudinal direction, said cross section comprising multiple triangular points radiating from a center, each of said triangular points corresponding to one of said projections.

\* \* \* \* \*